United States Patent Office.

CHARLES O. THOMPSON, OF WORCESTER, MASS., ASSIGNOR TO THE WASHBURN & MOEN MANUFACTURING COMPANY, OF SAME PLACE.

ART OF DRAWING WIRE.

SPECIFICATION forming part of Letters Patent No. 252,816, dated January 24, 1882.

Application filed September 2, 1881. (No specimens.)

*To all whom it may concern:*

Be it known that I, CHARLES O. THOMPSON, of the city and county of Worcester, and Commonwealth of Massachusetts, have invented certain new and useful Improvements in Modes or Processes of Wire-Drawing; and I do hereby declare that the following is a full, clear, and exact description of the same.

To enable those skilled in the art to which my invention belongs to make and use the same, I will proceed to describe it more in detail.

Acetate of calcium is dissolved in water, (warm water preferred,) and into such solution the wire is dipped or immersed, after which it is dried, when it is ready to be passed through the die-plates used in the ordinary mode of wire-drawing. This coating protects the surface of the wire from coming in contact with the metal of the die-plate, thereby preventing the wire from being scratched or the die-plates from being cut out during the operation of drawing the wire.

Wire coated with a solution of acetate of calcium previous to being drawn does not rust or corrode so quick as wire coated with a salt solution now extensively used in the art. My invention is therefore quite an important improvement in the art to which it belongs.

Having described my improved process of wire-drawing, what I claim therein as new and of my invention, and desire to secure by Letters Patent, is—

In the process of wire-drawing, preparing the wire to be drawn by coating or covering it with a solution of acetate of calcium, substantially as and for the purposes set forth.

CHARLES O. THOMPSON.

Witnesses:
   THOS. H. DODGE,
   EDWIN E. MOORE.